(12) United States Patent
Thierbach et al.

(10) Patent No.: US 11,994,409 B2
(45) Date of Patent: May 28, 2024

(54) ENRICHED AVIATION INFORMATION NOTICE

(71) Applicant: The Boeing Company, Chicago, IL (US)

(72) Inventors: Dirk Thierbach, Kelkheim im Taunus (DE); Thomas Winston Scott, Broomfield, CO (US); Aaron E. Wood, Strasburg, CO (US); Jeffrey N. Ross, Parker, CO (US); Randolph F. Porter, Centennial, CO (US)

(73) Assignee: The Boeing Company, Arlington, VA (US)

( * ) Notice: Subject to any disclaimer, the term of this patent is extended or adjusted under 35 U.S.C. 154(b) by 151 days.

(21) Appl. No.: 17/653,815

(22) Filed: Mar. 7, 2022

(65) Prior Publication Data

US 2023/0280187 A1    Sep. 7, 2023

(51) Int. Cl.
*G01C 21/00*       (2006.01)
*G06F 16/242*      (2019.01)
(Continued)

(52) U.S. Cl.
CPC ......... *G01C 21/387* (2020.08); *G06F 16/243* (2019.01); *G06F 16/24573* (2019.01); *G06F 16/29* (2019.01); *G08G 5/0004* (2013.01)

(58) Field of Classification Search
CPC ............... G01C 21/387; G06F 16/243; G06F 16/24573; G06F 16/29; G08G 5/0004
(Continued)

(56) References Cited

U.S. PATENT DOCUMENTS 10,380,259 B2 *  8/2019  Lee .................. G06N 5/022
10,867,282 B2 * 12/2020  Glunz .............. H04L 67/10
(Continued)

FOREIGN PATENT DOCUMENTS

CA    2688509 A1 * 12/2008  ............. G06F 9/45
JP  2012150515 A  *  8/2012  ............ G01C 21/00
(Continued)

OTHER PUBLICATIONS

"Jeppesen Airport Moving Maps," Jeppesen: A Boeing Company, Available Online at https://ww2.jeppesen.com/wp-content/uploads/2019/02/airport-moving-maps-fact-sheet.pdf, Available as Early as Jan. 25, 2021, 2 pages.

*Primary Examiner* — Atul Trivedi
(74) *Attorney, Agent, or Firm* — Alleman Hall & Tuttle LLP

(57) ABSTRACT

A computing device is provided comprising a processor and a memory storing instructions executable by the processor. The instructions are executable to receive a raw aviation information notice that comprises text. A text language analysis model is used to extract metadata from the raw aviation information notice. The metadata comprises aviation operation information that describes a status of a component of an airspace system. Geospatial aviation data is received that corresponds to the component of the airspace system. The aviation operation information is mapped to the geospatial aviation data to thereby generate geometry data for the aviation operation information. The geometry data and the metadata are used to generate an enriched aviation information notice. The instructions are further executable to output the enriched aviation information notice.

20 Claims, 10 Drawing Sheets

(51) Int. Cl.
  *G06F 16/2457*    (2019.01)
  *G06F 16/29*      (2019.01)
  *G08G 5/00*       (2006.01)

(58) Field of Classification Search
  USPC .......................................................... 701/532
  See application file for complete search history.

(56) References Cited

U.S. PATENT DOCUMENTS

| | | | |
|---|---|---|---|
| 10,936,618 B2 * | 3/2021 | Apple | G06N 20/00 |
| 11,562,662 B1 * | 1/2023 | Hall | G09B 9/165 |
| 2004/0103073 A1 * | 5/2004 | Blake | G06F 16/287 |
| 2009/0132316 A1 * | 5/2009 | Florance | G06Q 30/06 |
| | | | 715/810 |
| 2018/0061243 A1 * | 3/2018 | Shloosh | G08G 5/0043 |
| 2019/0213498 A1 * | 7/2019 | Adjaoute | G06Q 20/405 |
| 2021/0025975 A1 * | 1/2021 | Seeber | G01S 7/415 |
| 2021/0089055 A1 * | 3/2021 | Tran | B64U 10/30 |
| 2022/0018971 A1 * | 1/2022 | Bennington | G01S 19/06 |
| 2022/0018972 A1 * | 1/2022 | Bennington | G05D 1/101 |
| 2022/0398806 A1 * | 12/2022 | Arksey | H04W 28/24 |

FOREIGN PATENT DOCUMENTS

| | | | | |
|---|---|---|---|---|
| WO | WO-2014115139 A1 * | 7/2014 | ......... | B64D 45/0005 |
| WO | WO-2019174819 A1 * | 9/2019 | ............ | G06N 5/022 |
| WO | WO-2022074643 A1 * | 4/2022 | | |

\* cited by examiner

ENRICHED AVIATION INFORMATION NOTICE

BACKGROUND

Aviation information notices, such as Notices to Air Missions (NOTAMs), are text publications that alert pilots of aviation operation information, such as the status of a facility, service, procedure, or the presence of potential hazards. These notices also include additional information, such as a classification code, a geographic tag, a date stamp and/or a time stamp. In some examples, pilots and flight dispatchers review large numbers of such complex notices to plan and operate a flight.

SUMMARY

According to one aspect of the present disclosure, a computing device is provided comprising a processor and a memory storing instructions executable by the processor. The instructions are executable to receive a raw aviation information notice that comprises text. A text language analysis model is used to extract metadata from the raw aviation information notice. The metadata comprises aviation operation information that describes a status of a component of an airspace system. Geospatial aviation data is received that corresponds to the component of the airspace system. The aviation operation information is mapped to the geospatial aviation data to thereby generate geometry data for the aviation operation information. The geometry data and the metadata are used to generate an enriched aviation information notice. The instructions are further executable to output the enriched aviation information notice.

This simplified summary of the specification is presented to provide a basic understanding of some aspects of the specification. This summary is not an extensive overview of the specification. It is intended to neither identify key or critical elements of the specification nor delineate any particular embodiments of the specification, or any scope of the claims. Its sole purpose is to present some concepts of the specification in a simplified form as a prelude to the more detailed description that is presented in this disclosure.

The features, functions, and advantages that have been discussed can be achieved independently in various embodiments or can be combined in yet other embodiments, further details of which can be seen with reference to the following description and drawings.

DETAILED DESCRIPTION

Aviation information notices, such as Notices to Air Missions (NOTAMs), are text publications that alert pilots of the status of a facility, a service, or a procedure, the presence of potential hazards, or any other information relevant to aviation operations. These publications also include additional information describing the notice, such as a classification code, a geographic tag, a date stamp and/or a time stamp. This information can also include specialized abbreviations, contractions, or other language specific to the aviation industry. In addition, the language and structure can be different between originating sources of a notice. For example, a NOTAM issued by the United States Federal Aviation Administration (FAA) can have different language and structure than a NOTAM issued by the European Organization for the Safety of Air Navigation (Eurocontrol).

As such, aviation information notices can be difficult to read and contextualize. Information provided in a notice, such as how and where an object is affected by a notice, object identification and geometry, can be difficult to understand, particularly during flight. Furthermore, in some instances, pilots and flight dispatchers review large numbers of such complex notices to plan and operate a flight, a process which can be time-consuming and prone to error.

To help make NOTAMs easier to read, current NOTAM processing systems use one or more computing devices to process aviation information notices using heuristic algorithms. Some examples of heuristics include complex pattern matches that are applied to detect data elements in text of the notice. However, it can be challenging to extract information from notices that use complex language or descriptions of spatial relationships to describe affected areas or objects.

Thus, to address the above issues, examples are disclosed that relate to generating an enriched aviation information notice. Briefly, a text language analysis model is used to extract metadata from a raw aviation information notice. The metadata comprises aviation operation information that describes a status of a component of an airspace system. Geometry data is generated by mapping the aviation operation information to geospatial aviation data that corresponds to the component of the airspace system. The geometry data and the metadata are used to generate the enriched aviation information notice. In this manner, a raw aviation information notice is translated into a format that is more easily understood.

Figure 1:
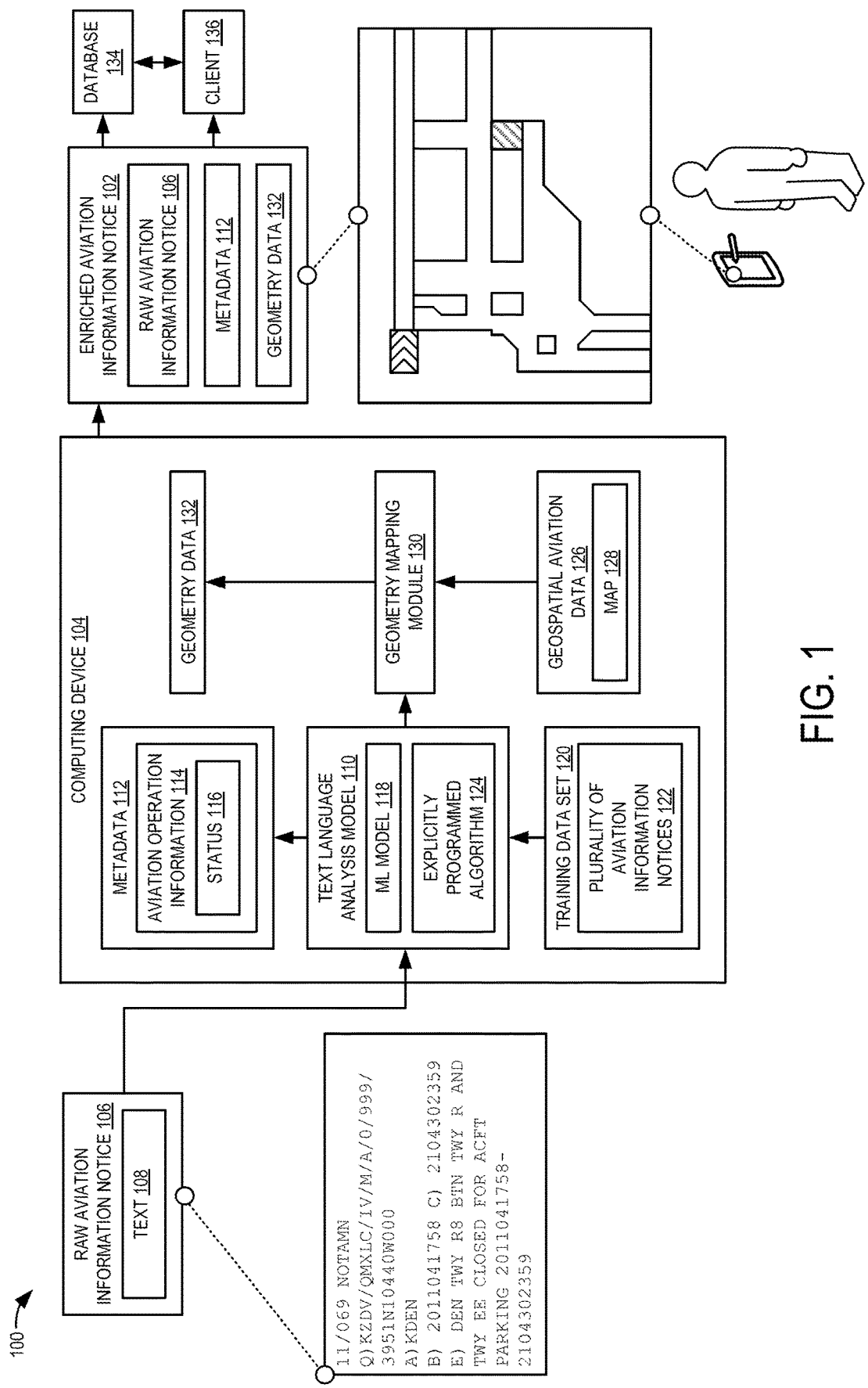
FIG. 1 shows a block diagram of an example system for generating an enriched aviation information notice.

FIG. 1 shows an example of a system 100 for generating an enriched aviation information notice 102. The system 100 includes a computing device 104. The computing device 104 comprises a processor and a memory storing instructions executable by the processor. The instructions are executable to implement the methods and processes described herein. Additional aspects of the computing device 104 are described in more detail below with reference to FIG. 9.

The computing device 104 is configured to receive a raw aviation information notice 106. As introduced above, the raw aviation information notice 106 comprises text 108. In some examples, the raw aviation information notice 106 comprises a NOTAM received from the FAA, Eurocontrol, or another aviation authority.

Figure 2:
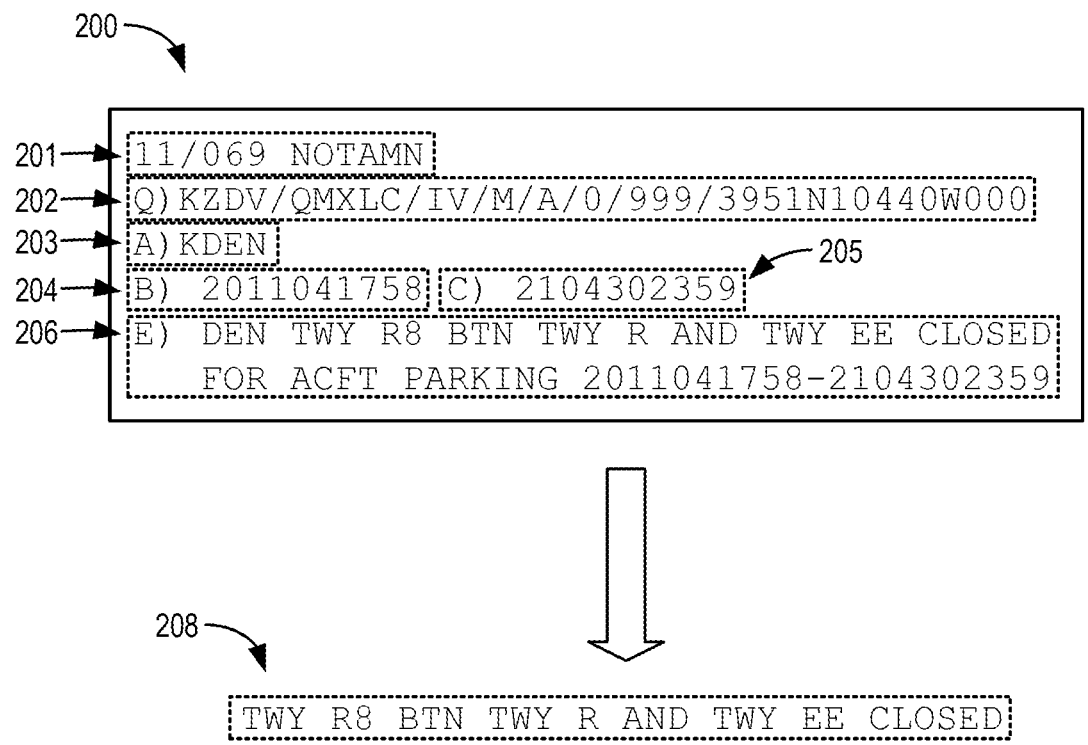
FIG. 2 shows an example of a raw aviation information notice that can be used in the system of FIG. 1.

FIG. 2 shows one example of a raw aviation information notice 200. The raw aviation information notice 200 can serve as the raw aviation information notice 106 of FIG. 1. In the example of FIG. 2, the raw aviation information notice 200 comprises a NOTAM describing a taxiway closure at Denver International Airport. The NOTAM comprises a first line 201 that includes a NOTAM identification. The NOTAM also comprises a second line 202 ("Q") encoding a subject of the NOTAM and a status of the subject being reported. A third line 203 ("A") includes the International Civil Aviation Organization (ICAO) code of an affected airport or flight information region for the NOTAM. In the example of FIG. 2, the third line 203 indicates that the NOTAM is for "KDEN" (Denver International Airport). A fourth line 204 ("B") includes a start date and time for the NOTAM (e.g., 2011041758), and a fifth line 205 ("C") includes an end date and time for the NOTAM (e.g., 2104302359). A sixth line 206 ("E") includes a description of the NOTAM. In the example of FIG. 2, the sixth line 206 indicates that taxiway R8 is closed between taxiway R and taxiway EE for aircraft parking.

With reference again to FIG. 1, a text language analysis model 110 is used to extract metadata 112 from the raw aviation information notice 106. The metadata comprises aviation operation information 114 that describes a status 116 of a component of an airspace system. The airspace system includes any airspace regions, navigation facilities and airports associated with a corresponding area, along with their associated information, services, rules, regulations, policies, procedures, personnel, and equipment. For example, the United States National Airspace System includes airspace regions, navigation facilities, and airports of the United States. As described in more detail below, the aviation operation information 114 describes the status of a facility, service, procedure, hazard, or any other aspect of the airspace system. Some examples of facilities available at a particular airport include, but are not limited to, taxiways, runways, ramps, and aprons. Some examples of services include, but are not limited to, ground control, an air traffic control tower, an automatic terminal information service (ATIS), fuel, and fixed base operation (FBO) services. Procedures may include, but are not limited to, taxi procedures, clearance procedures, and approach procedures. Hazards may include, but are not limited to, aerobatic activity, military activity, pyrotechnics, structures, and terrain.

FIG. 2 also shows an example of metadata 208 extracted from the raw aviation information notice 200. The metadata 208 comprises a subset of text extracted from the description in the sixth line 206 that includes a summary of the aviation operation information contained in the NOTAM (e.g., "TWY R8 BTN TWY R AND TWY EE CLOSED"). The metadata 208 indicates the subject taxiway (R8), the status of the taxiway ("CLOSED"), and intersections between which the taxiway is closed (between R8/R and R8/EE). In this manner, the metadata 208 provides a summary of the raw aviation information notice 200 that is further processed to generate an enriched aviation information notice, facilitating a richer description of the content.

Incoming text is processed using language analysis tools tailored for the specialized language used in aviation information notices. The raw aviation information notice is parsed to identify individual components of the text, such as words, phrases, and codes. Some examples of components that are parsed out of the raw aviation information notice include, but are not limited to, NOTAM line identifiers, international NOTAM ("Q") codes, taxiways, and intersections. In the example of FIG. 2, the raw notice 200 is processed to extract the status of taxiway R8 ("CLOSED") from six lines of text 201-206 containing other features of the notice, which can be difficult to read. Accordingly, and in one potential technical advantage of the present disclosure, the text language analysis model quickly and reliably extracts text components of the raw aviation information notice that are used to formulate the metadata.

With reference again to FIG. 1, in some examples, the text language analysis model 110 comprises a machine learning model 118. In some examples, the machine learning model comprises a neural network. In other examples, the machine learning model comprises any other suitable type of model. Some other examples of suitable machine learning models include, but are not limited to, a decision tree, a native Bayes algorithm, a support vector machine, a principal component analysis algorithm, a k-means clustering algorithm, a generative model, a transductive support vector machine, and a k-nearest neighbors algorithm.

The machine learning model 118 is used to automatically extract, classify, and label words and/or symbols in the text 108 of the raw aviation information notice 106, thereby outputting the metadata 112. By using the machine learning model 118, as opposed to an explicitly programmed algorithm, rules and classifiers are produced automatically, without the potentially time-consuming process of explicitly programming the model to output a predetermined meaning in response to input words, phrases and symbols. In addition, the machine learning model 118 is flexible to adapt to growing and/or changing datasets.

To address the specialized language found in aviation information notices, the machine learning model 118 is trained on a training data set 120 that comprises a plurality of aviation information notices 122. As the training data set 120 is based upon aviation information notices, the trained machine learning model 118 abbreviations, contractions, and other specialized language specific to the aerospace industry or a source of the notices (e.g., the FAA) more accurately than a model trained on standard language data (e.g., everyday English).

In some examples, the machine learning model 118 is trained via a supervised learning approach. In the supervised learning approach, the machine learning model 118 learns how to map an input to an output based on explicit input-output pairs. In one potential technical advantage of supervised learning, the machine learning model 118 can be guided towards an accurate understanding of relevant language concepts.

In one example, a supervised artificial intelligence model includes a neural network, and the training takes place using backpropagation with gradient descent. The neural network has an input layer connected to one or more convolutional layers. The one or more convolutional layers are configured to extract features and reduce dimensionality of an input vector. The one or more convolutional layers are connected on a downstream side to one or more fully connected deep learning layers, which in turn are connected to an output layer. When configured as a classification network, each of the nodes in the output layer corresponds to a respective predicted response label for the run-time input. Alternatively, the output layer can be configured with a single output node that uses neural network regression to sums inputs from prior layers to output a single scalar value. As the neural network is trained, an input vector and matched ground truth labels, which can be classifications or scalar values, are applied to the input layer and output layer respectively, and the weights in the network are computed through gradient descent and the backpropagation algorithm, for example, such that the trained neural network will properly classify (or properly value) the input vector to the matched ground truth classification or scalar value in the output layer.

In another example, the neural network is trained through a competitive learning algorithm rather than backpropagation and gradient descent to both reduce the dimensionality of the input vectors and maximize the distance between output cluster classifications. The result is output as a self-organizing feature map.

In other examples, the machine learning model 118 is trained via an unsupervised learning approach. In the unsupervised learning approach, the machine learning model 118 is not provided with predetermined outputs associated with the training data. Advantageously, in some examples of unsupervised learning, the machine learning model 118 is trained using unlabeled data that is faster and easier to prepare than a labeled training data set used for supervised learning. In addition, the machine learning model 118 is free to learn unlabeled patterns that may not be recognized by conducting supervised training on a labeled training data set.

In yet other examples, the machine learning model 118 is trained using any other suitable training method. Some examples of other suitable training methods include, but are not limited to, semi-supervised learning (e.g., self-training), reinforcement learning, multi-task learning, ensemble learning (e.g., boosting and bagging), and instance-based learning. In this manner, users have the flexibility to choose a training approach that achieves desirable results for a particular use-case scenario.

In other examples, instead of or alternatively to a machine learning model, the text language analysis model 110 comprises an explicitly programmed algorithm 124. Any suitable text language analysis algorithm can be used. One example of a suitable algorithm is a decision tree. In some examples of a decision tree, each phrase in the text 108 is compared against a labeled phrase. If the phrases do not match, the phrase in the text 108 is compared against another labeled phrase.

Rules used to identify a match between the phrases are explicit and adjustable. In this manner, the rule-based algorithm 124 can be tuned to accurately match an input word, phrase, or symbol to a desired output. For example, when the word "TWY" is input into the rule-based algorithm, the rules used to process the input can be manually adjusted to ensure the algorithm outputs "taxiway" rather than "runway" or "highway". In contrast to machine learning approaches, and because the rules that link the text 108 to the metadata 112 are explicitly defined, the rules are readily inspected or modified. In this manner, the rule-based algorithm 124 allows users and developers to exert a fine level of control over the text language analysis process.

Figure 3:
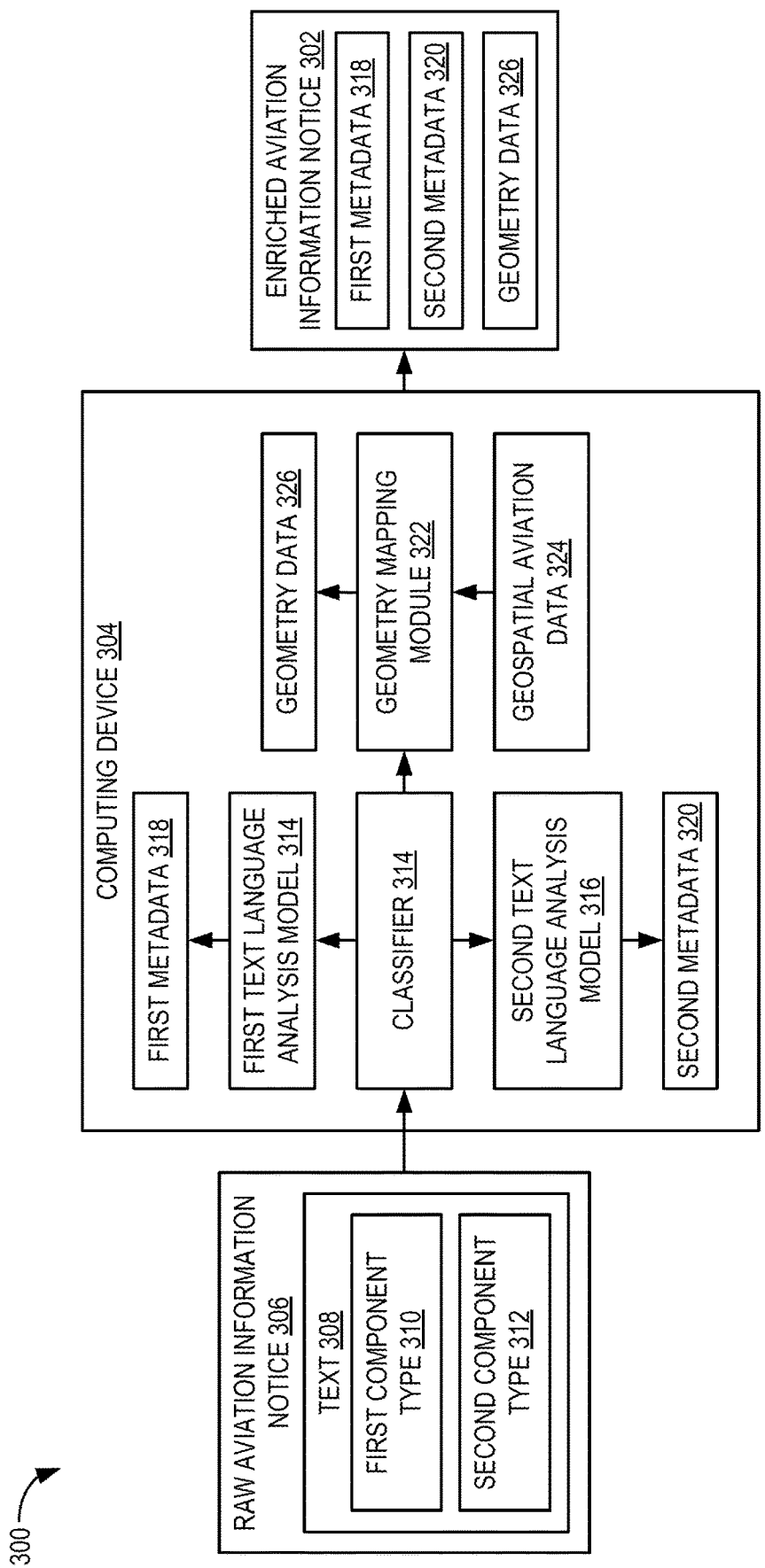
FIG. 3 shows a block diagram of another example system for generating an enriched aviation information notice.

With reference now to FIG. 3, in some examples, two or more different text language analysis models are used to process a raw aviation information notice. FIG. 3 shows another example of a system 300 for generating an enriched aviation information notice 302. The system 300 includes a computing device 304 configured to receive a raw aviation information notice 306. The raw aviation information notice 306 comprises text 308 including a first component type 310 of an airspace system, a second component type 312 of the airspace system, or a combination of both the first component type 310 and the second component type 312. In some examples, the first component type 310 is a taxiway and the second component type 312 is a runway. It will also be appreciated that the first component type 310 and the second component type 312 may include any other suitable airspace system components, such as navigation aids, waypoints, a parking/maintenance apron, a preflight ramp, and/or a controlled airspace region, as examples.

The computing device 304 comprises a first text language analysis model 314 configured to process notices relating to the first component type 310 (e.g., a taxiway) and a second text language analysis model 316 configured to process notices relating to the second component type 312 (e.g., a runway). In some examples, the first text language analysis model 314 and the second text language analysis model 316 comprise the same type of model (e.g., a rule-based algorithm or a machine learning model). In other examples, the first text language analysis model 314 and the second text language analysis model 316 are different types of models. By implementing different methods, rules, or training, the first text language analysis model 314 and the second text language analysis model 316 are specialized for processing the first component type 310 and the second component type 312, respectively, and can thereby produce more accurate output pertaining to their respective component types than a single, general language analysis module. However, in other examples, a general language analysis module can be used.

To route the raw aviation information notice 306 to the appropriate text language analysis module, the computing device 304 comprises a classifier 328 configured to classify the component(s) of the airspace system described in the raw aviation information notice 306. In the example of FIG. 3, the classifier 328 outputs a determination that the text 308 includes the first component type 310, the second component type 312, or both the first component type 310 and the second component type 312.

Based at least on a determination that a component is the first component type 310, the first language analysis model 314 is used to extract first metadata 318 from the raw aviation information notice 306. Based at least on a determination that the component is the second component type 312, the second language analysis model 316 is used to extract second metadata 320 from the raw aviation information notice 306. When the raw aviation information notice 306 includes both the first component type 310 and the second component type 312, both the first language analysis model 314 and the second language analysis model 316 are used to extract both the first metadata 318 and the second metadata 320, respectively. In this manner, the computing device 304 generates metadata that accurately summarizes the status of each airspace system component described in the notice.

Returning to FIG. 1, the computing device 104 is further configured to receive geospatial aviation data 126 that corresponds to the component of the airspace system. The geospatial aviation data provides additional context for interpreting the text 108 of the notice 106.

Figure 4:
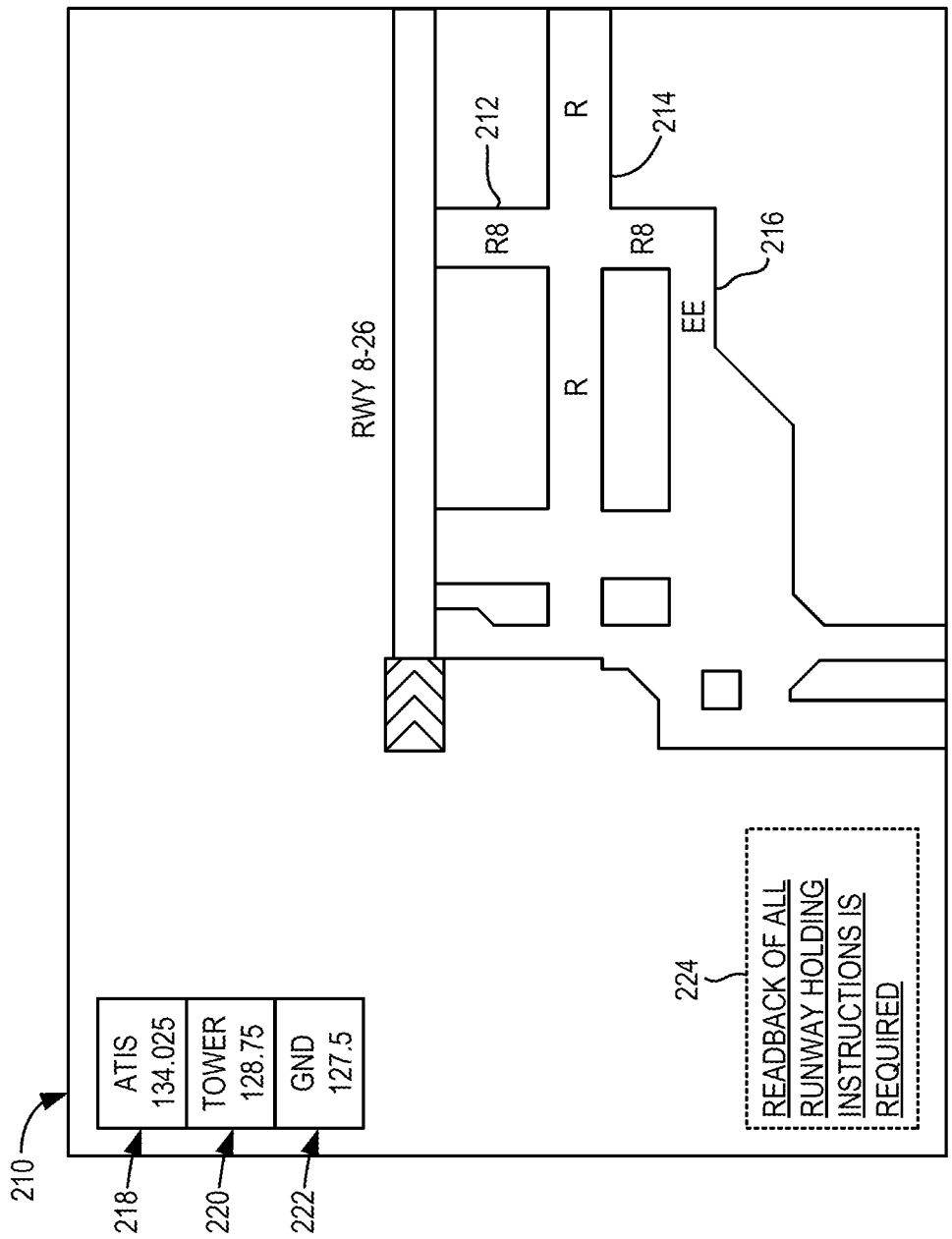
FIG. 4 shows an example of a map that can be used in the system of FIG. 1.

In some examples, the geospatial aviation data comprises a map 128. The map 128 corresponds to a geographic area described in the notice 106. For example, the notice 200 of FIG. 2 reflects the status of a ground component (taxiway R8) at Denver International Airport. FIG. 4 shows an example of a map corresponding to the notice 200 of FIG. 2, in the form of an airport diagram 210 of Denver International Airport. The airport diagram 210 can serve as the map 128 of FIG. 1.

The airport diagram 210 includes ground facilities at Denver International Airport, including taxiway R8 (212), taxiway R (214) and taxiway EE (216). The airport diagram 210 also indicates that an ATIS service 218 is available and indicates its radio frequency, as well as frequencies for an air traffic control tower 220 and a ground control service 222.

The airport diagram 210 further indicates a reminder of a ground procedure 224 with the text "readback of all runway holding instructions is required". The ATIS service 218, the air traffic control service 220, the ground control service 222, and the ground procedure 224 are other examples of services and procedures that can be affected by other examples of aviation information notices.

Figure 5:
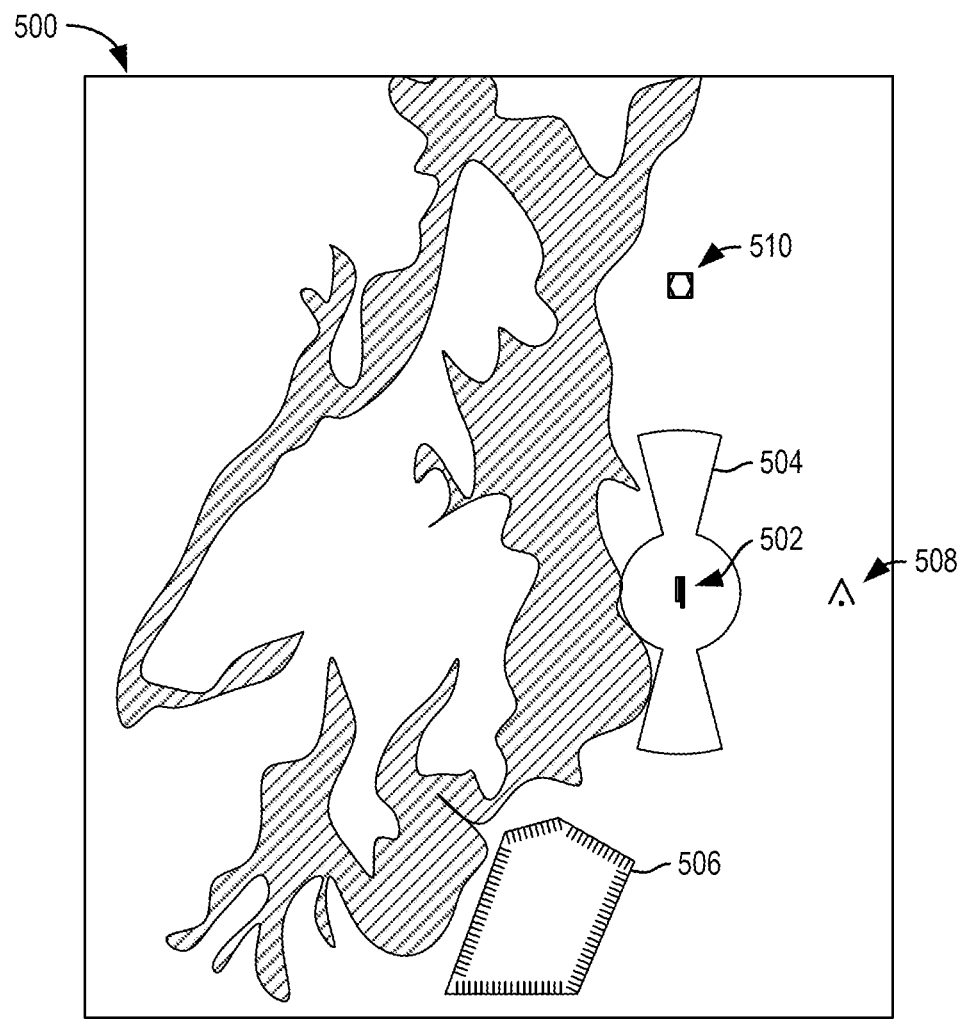
FIG. 5 shows another example of a map that can be used in the system of FIG. 1.

FIG. 5 shows another example of a map 500, which can serve as the map 128 of FIG. 1. The map 500 includes an airport 502 and controlled airspace 504 surrounding the airport 502. The map 500 also indicates a restricted area 506 and a hazard in the form of an obstruction 508. The map 500 further includes a navigation facility in the form of a very high frequency omni-directional range (VOR) station 510. The airport 502, airspace 504, restricted are 506, the obstruction 508, and the VOR station 510 are examples of airspace regions, hazards, and navigation facilities that can be affected by other examples of aviation information notices.

Advantageously, by using a map as a source of the geospatial aviation data 126, the computing device 104 can readily generate a graphically enriched aviation information notice that is quickly and easily understood by an end user (e.g., a pilot or flight dispatcher). In other examples, the geospatial aviation data 126 of FIG. 1 comprises an abstract geographical format, such as a table of coordinates corresponding to physical objects, which may occupy less memory and be faster for a computing device to query and process than a graphic map.

The computing device 104 comprises a geometry mapping module 130 that receives the geospatial aviation data 126. The geometry mapping module 130 is configured to map the aviation operation information 114 to the geospatial aviation data 126 to thereby generate geometry data 132 for the aviation operation information 114. Like the system of FIG. 1, the computing device 304 comprises a geometry mapping module 322 that receives geospatial aviation data 324. The geometry mapping module 322 maps the first metadata 318 and/or the second metadata 320 to the geospatial aviation data 324 to thereby generate geometry data 326.

With reference again to FIG. 1, and as described in more detail below, the geospatial aviation data 126 and the extracted metadata 112 are used to build one or more geometric objects corresponding to an object or area affected by the raw aviation information notice 106. The combination of the extracted metadata 112 and the geospatial aviation data 126 (e.g., the map 128) allows the creation of a focused and detailed representation of the information contained in the raw aviation information notice 106 and thus can make decision making processes faster and more accurate during flight planning and briefing, as well as in flight.

Figure 6:
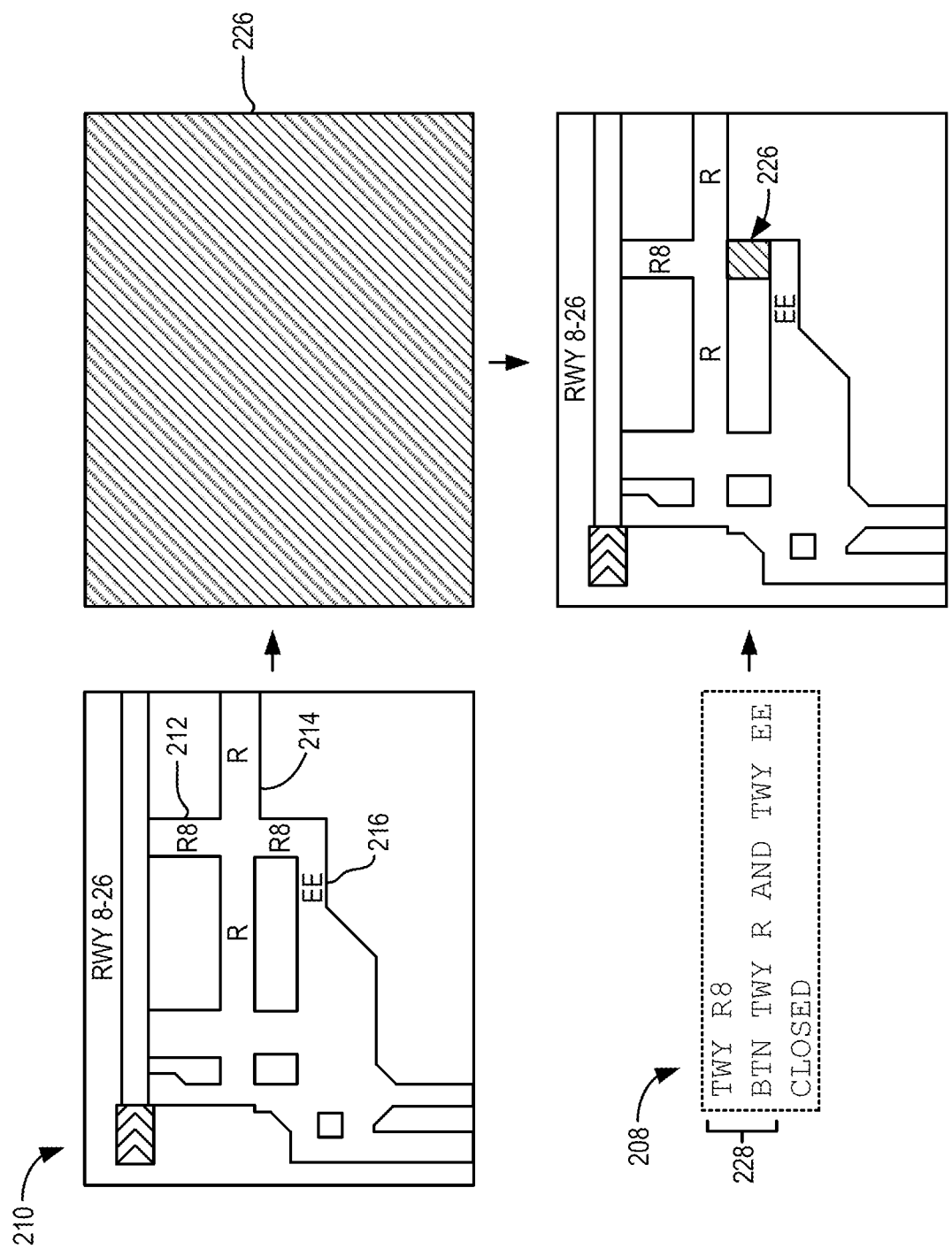
FIG. 6 shows an example of mapping aviation operation information to geospatial aviation data to generate an enriched aviation information notice.

FIG. 6 shows a graphical depiction of an example of mapping aviation operation information to geospatial aviation data to generate an enriched aviation information notice. FIG. 6 shows the metadata 208 of FIG. 2 and a portion of the airport diagram 210 of FIG. 4 that corresponds to the metadata 208.

To generate the graphical depiction of the aviation operation information contained in the metadata, a geographical representation of the aviation operation information is generated over a map. In the example of FIG. 6, the metadata 208 indicates that taxiway R8 (212) is closed. As such, a geographical representation 226 is generated that indicates a closed status of the taxiway. The geographical representation 226 can serve as the geometry data 132 of FIG. 1

In some examples, the geographical representation 226 is generated in a new layer over the airport diagram 210 such that the geographical representation 226 covers the entirety of the airport diagram. In this manner, the geographical representation 226 can be refined to a specific area affected by the aviation operation information.

To refine the geographical representation 226, boundary information 228 is extracted from the metadata 208. The boundary information 228 defines a region of the map affected by the aviation operation information. In the example depicted in FIG. 6, the metadata 208 identifies the taxiway that is closed (R8) and the endpoints of the closure (between taxiway R and taxiway EE).

The boundary information is used to refine the geographical representation to the region of the map affected by the aviation operation information. In the example of FIG. 6, the boundary information 228 is used to query a computer-readable index of taxiways at Denver International Airport and geospatial information defining their locations and dimensions, and thus localize the region of the taxiway that is closed. The geographical representation 226 of the closure is resized to fit the region of the taxiway that is closed. In this manner, the metadata 208 derived by text language analysis and the geospatial aviation data are used to generate a detailed and specific spatial depiction of the information supplied by the notice 200 of FIG. 2.

With reference again to FIG. 1, the geometry data 132 and the metadata 112 are used to generate and output the enriched aviation information notice 102. In some examples, the enriched aviation information notice 102 is output to a local memory or processor on the computing device 104. In other examples, the enriched aviation information notice is output to another device, such as a workstation computing device or an electronic flight bag.

In yet other examples, the enriched aviation information notice is output to a database 134. In some examples, the database 134 is located at the computing device 104. In other examples, the database 134 is located at another computing device, such as a server computing device configured to store the enriched aviation information notice 102 and/or perform downstream processing. In some examples, the database 134 is configured to be queried by a client device 136, such as a workstation at a flight dispatch center or air traffic control office. The client device 136 can load and/or output the enriched aviation information notice 102 from the database 134. For example, and as described in more detail below, the client device 136 can generate and display a visual representation of the enriched aviation information notice 102.

In some examples, the enriched aviation information notice 102 comprises the raw aviation information notice 106, the geometry data 132, and the metadata 112. With reference to the example of FIG. 3, when the raw aviation information notice 306 comprises the first component type 310 and the second component type 312, the enriched aviation notice 302 comprises the first metadata 318 and the second metadata 320 corresponding to the first component type 310 and the second component type 312, respectively. In some examples, the enriched aviation notice 302 further comprises the geometry data 326. In this manner, the extracted metadata (e.g., the metadata 112, the first metadata 318, and/or the second metadata 320) and the geometry data (e.g., the geometry data 132 or the geometry data 326) provide context for the aviation information notice.

Figure 7:
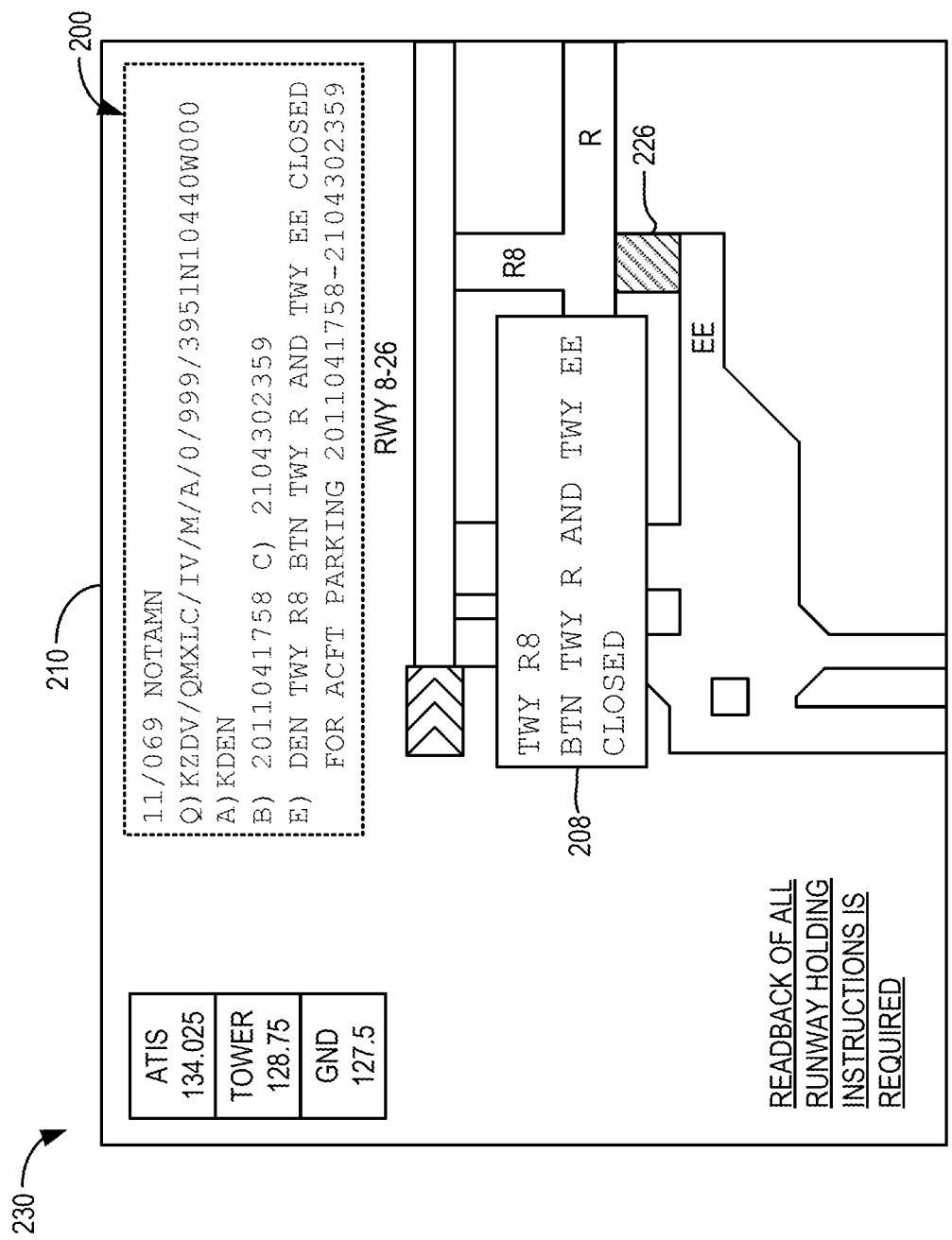
FIG. 7 shows an example of an enriched aviation information notice that can be generated by the system of FIG. 1.

FIG. 7 shows an example of an enriched aviation information notice 230 corresponding to the raw aviation information notice 200 of FIG. 2. The enriched aviation information notice 230 comprises a graphical representation of the aviation operation information. The graphical representation includes the full text of the raw notice 200, a text representation of the metadata 208, and the geometry data in the form of the geographical representation 226 of FIG. 6 overlaid onto the airport diagram 210 of FIG. 4. By visually depicting the information contained in the raw notice 200, the enriched aviation information notice 230 allows an end user (e.g., a pilot, a flight dispatcher, or an air traffic controller) to understand and contextualize the notice 200 quickly and efficiently, and increases the end user's situational awareness. Further, by including the full text of the raw notice, an end user can refer to the text for clarification or to confirm that the graphical representation of the aviation operation information is accurate.

In some examples, the graphical representation is generated at the computing device 104 of FIG. 1. In other examples, the graphical representation is generated at another computing device, such as the client device 136. In such examples, graphic rendering, which can be computationally expensive, is offloaded from the computing device 104.

Figure 8A:
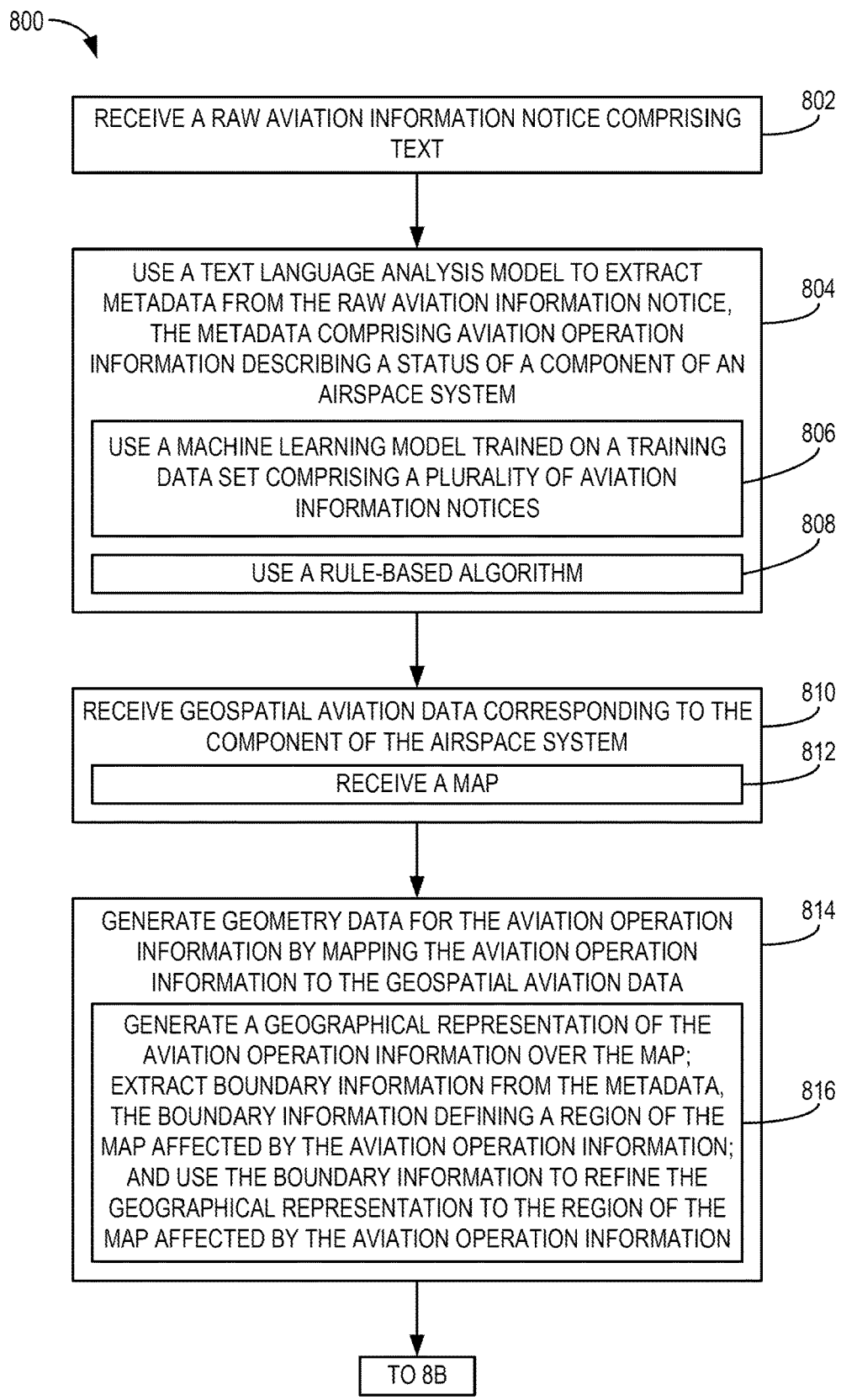
FIGS. 8A-8B show a block diagram of an example method for generating an enriched aviation information notice.
Figure 8B:
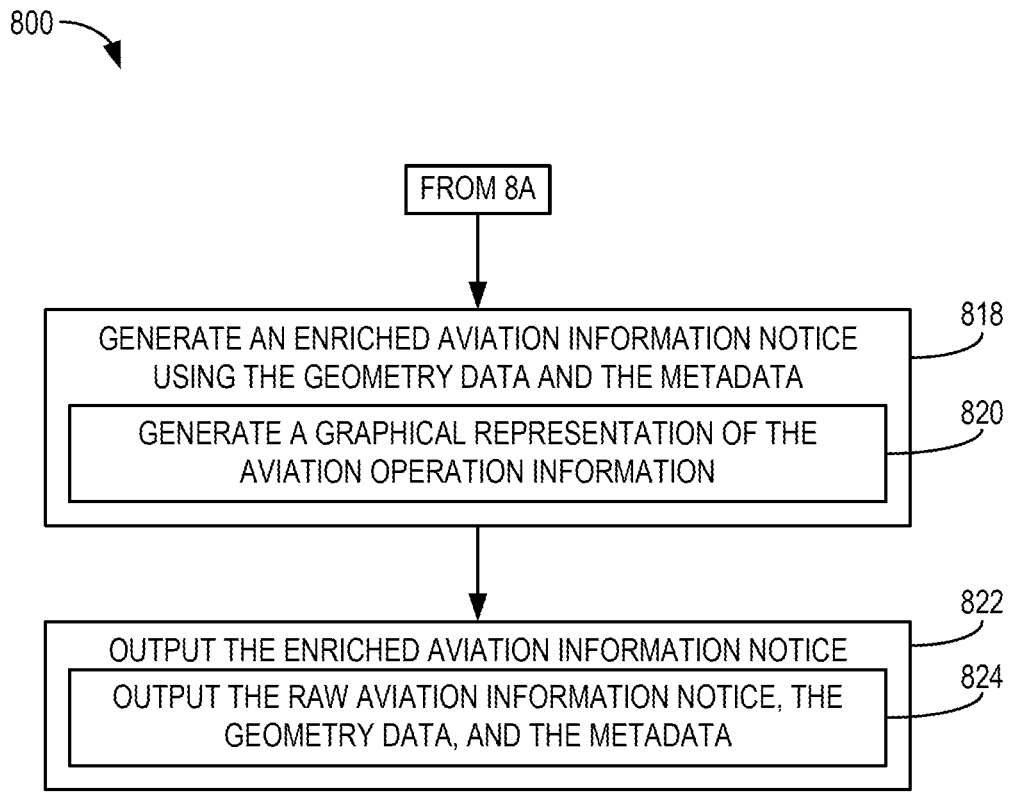

FIGS. 8A and 8B show a flow diagram depicting an example method 800 for generating an enriched aviation information notice. The following description of method 800 is provided with reference to the components described herein and shown in FIGS. 1-7 and 9. In some examples, the method 800 is performed at the computing device 104 of FIG. 1 or the computing device 304 of FIG. 3. In other examples, the method 800 is performed in other contexts using other suitable components.

With reference first to FIG. 8A, at 802, the method 800 comprises receiving a raw aviation information notice comprising text. For example, the computing device 104 of FIG. 1 is configured to receive the raw aviation information notice 106 and the computing device 304 of FIG. 3 is configured to receive the raw aviation information notice 306.

At 804, the method 800 comprises using a text language analysis model to extract metadata from the raw aviation information notice. The metadata comprises aviation operation information describing a status of a component of an airspace system. In the example of FIG. 2, the metadata 208 is extracted from the raw aviation information notice 200. The metadata serves as a summarized description of the raw aviation information notice, which occupies less memory than a full aviation information notice and can be easier for a user to read and interpret.

In some examples, and as indicated at 806, using the text language analysis model to extract the metadata from the raw aviation information notice comprises using a machine learning model trained on a training data set comprising a plurality of aviation information notices. As described above, in some examples, the text language analysis model 110 of FIG. 1 comprises machine learning model 118. In one potential advantage of the present disclosure, the machine learning model 118 learns to understand the text of the raw aviation information notice without explicitly programmed rules and classifiers.

As indicated at 808, in some examples, using the text language analysis model to extract the metadata from the raw aviation information notice comprises using a rule-based algorithm. As described above, in some examples, the text language analysis model 110 of FIG. 1 comprises rule-based algorithm 124. In this manner, the rules that generate the metadata from the text of the raw aviation information notice are explicitly defined and are thus readily inspected or modified.

At 810, the method 800 includes receiving geospatial aviation data corresponding to the component of the airspace system. For example, the computing device 104 of FIG. 1 is configured to receive geospatial aviation data 126 that corresponds to the notice 106. The geospatial aviation data provides additional context for interpreting the aviation information notice.

In some examples, and as indicated at 812, receiving the geospatial aviation data comprises receiving a map. FIG. 4 shows an example of a map in the form of an airport diagram 210, which can serve as the map 128 of FIG. 1. Advantageously, by using a map as a source of the geospatial aviation data, the map is readily available to generate a graphic depiction of the aviation information notice.

At 814, the method 800 includes generating geometry data for the aviation operation information by mapping the aviation operation information to the geospatial aviation data. As described above, mapping the aviation operation information to the geospatial aviation data allows the creation of a focused and detailed representation of the information contained in the raw aviation information notice.

In some examples, as indicated at 816, mapping the aviation operation information to the geospatial aviation data comprises generating a geographical representation of the aviation operation information over the map. Boundary information is extracted from the metadata. The boundary information defines a region of the map affected by the aviation operation information. The boundary information is used to refine the geographical representation to the region of the map affected by the aviation operation information. In this manner, the metadata derived by text language analysis and the geospatial aviation data are used to generate a detailed and specific spatial depiction of the information supplied by the raw aviation information notice.

With reference now to FIG. 8B, at 818, the method 800 comprises generating an enriched aviation information notice using the geometry data and the metadata. In this manner, the raw aviation information notice is translated into a format that is more easily understood.

In some examples, at 820, generating the enriched aviation information notice comprises generating a graphical representation of the aviation operation information. In one potential advantage of the present disclosure, depicting the information contained in the raw aviation information notice in a graphic format enables an end user to understand and contextualize the information more quickly than the text of the notice.

At 822, the method 800 comprises outputting the enriched aviation information notice. For example, the enriched aviation information notice 102 of FIG. 1 is output by the computing device 104 and the enriched aviation information notice 302 of FIG. 3 is output by the computing device 304.

In some examples, at 824, outputting the enriched aviation information notice comprises outputting the raw aviation information notice, the geometry data, and the metadata. In this manner, the original notice, as well as the context provided by the geometry data and the focused metadata, are made available for further querying and/or processing, and/or are output to an end user.

In some embodiments, the examples described herein can be tied to a computing system of one or more computing devices. In particular, aspects of such methods and processes can be implemented as a computer-application program or service, an application-programming interface (API), a library, and/or other computer-program product.

Figure 9:
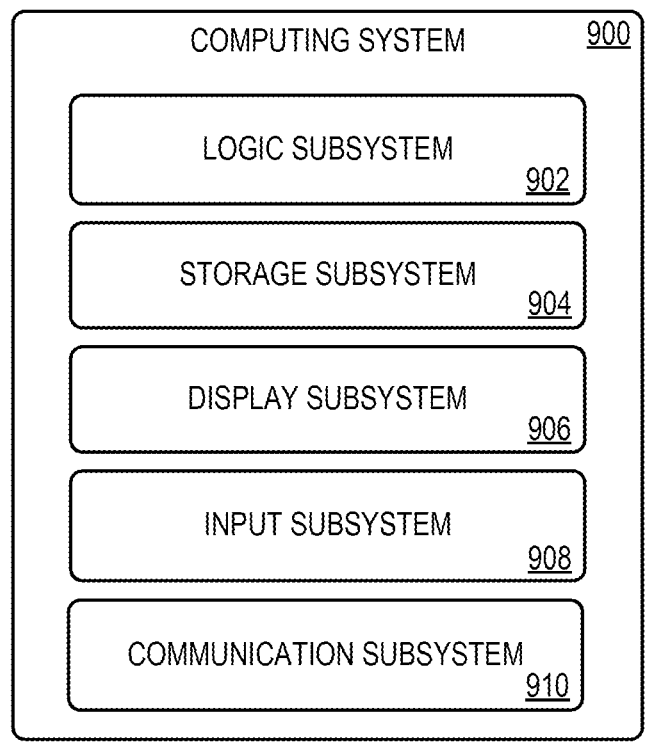
FIG. 9 shows a block diagram of an example computing system.

FIG. 9 schematically shows a non-limiting embodiment of a computing system 900 that can enact one or more of the examples described above. For example, computing system 900 can be used to execute instructions to perform the method 800 of FIGS. 8A-8B, and/or potentially perform other functions.

Computing system 900 is shown in simplified form. Computing system 900 can take the form of one or more personal computers, server computers, tablet computers, network computing devices, mobile computing devices, mobile communication devices (e.g., smart phone), and/or other computing devices. In some examples, the computing device 104 of FIG. 1 and/or the computing device 304 of FIG. 3 comprise one or more aspects of the computing system 900.

Computing system 900 includes a logic subsystem 902, a storage subsystem 904, and a display subsystem 906. Computing system 900 can optionally include an input subsystem 908, a communication subsystem 910, and/or other components not shown in FIG. 9.

Logic subsystem 902 includes one or more physical devices configured to execute instructions. For example, logic subsystem 902 can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result. For example, logic subsystem 902 can be used to execute instructions to perform the method 800 of FIGS. 8A-8B.

Logic subsystem 902 can include one or more processors configured to execute software instructions. Additionally or alternatively, logic subsystem 902 can include one or more hardware or firmware logic machines configured to execute hardware or firmware instructions. Processors of logic subsystem 902 can be single-core or multi-core, and the instructions executed thereon can be configured for sequential, parallel, and/or distributed processing. Individual components of logic subsystem 902 optionally can be distributed among two or more separate devices, which can be remotely located and/or configured for coordinated processing. Aspects of logic subsystem 902 can be virtualized and executed by remotely accessible, networked computing devices configured in a cloud-computing configuration.

Storage subsystem 904 includes one or more physical devices configured to hold instructions executable by logic subsystem 902 to implement the methods and processes described herein. For example, storage subsystem 904 can hold instructions executable to perform the method 800 of FIGS. 8A-8B, and/or potentially perform other functions. When such methods and processes are implemented, the state of storage subsystem 904 can be transformed—e.g., to hold different data.

Storage subsystem 904 can include removable and/or built-in devices. Storage subsystem 904 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 can include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 902 and storage subsystem 904 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 906 can be used to present a visual representation of data held by storage subsystem 904. This visual representation can take the form of a graphical user interface (GUI). As the herein described methods and processes change the data held by the storage subsystem 904, and thus transform the state of the storage machine, the state of display subsystem 906 can likewise be transformed to visually represent changes in the underlying data. For example, display subsystem 906 can be configured to display the enriched aviation information notice 230 of FIG. 7.

Display subsystem 906 can include one or more display devices utilizing virtually any type of technology. Such display devices can be combined with logic subsystem 902 and/or storage subsystem 904 in a shared enclosure, or such display devices can be peripheral display devices.

When included, input subsystem 908 can comprise or interface with one or more user-input devices such as a keyboard, mouse, touch screen, or joystick. In some embodiments, the input subsystem 908 can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. For example, input subsystem 908 can be configured to receive user inputs while performing the method 800, and/or displaying the enriched aviation information notice 230.

When included, communication subsystem 910 can be configured to communicatively couple computing system 900 with one or more other computing devices. Communication subsystem 910 can include wired and/or wireless communication devices compatible with one or more different communication protocols. As non-limiting examples, the communication subsystem can be configured for communication via a wireless telephone network, or a wired or wireless local- or wide-area network. In some embodiments, communication subsystem 910 can allow computing system 900 to send and/or receive messages (e.g., the enriched aviation information notice 102 output by the computing device 104) to and/or from other devices via a network such as the Internet. For example, communication subsystem 910 can be used receive or send data to another computing system. As another example, communication subsystem may be used to communicate with other computing systems during execution of method 800 in a distributed computing environment.

Further, the disclosure comprises configurations according to the following clauses.

Clause 1. A computing device, comprising: a processor; and a memory storing instructions executable by the processor to: receive a raw aviation information notice that comprises text; use a text language analysis model to extract metadata from the raw aviation information notice, the metadata comprising aviation operation information that describes a status of a component of an airspace system; receive geospatial aviation data that corresponds to the component of the airspace system; map the aviation operation information to the geospatial aviation data to thereby generate geometry data for the aviation operation information; use the geometry data and the metadata to generate an enriched aviation information notice; and output the enriched aviation information notice.

Clause 2. The computing device of clause 1, wherein the aviation operation information describes the status of a facility, service, procedure, or hazard, and wherein the airspace system comprises an airspace region, a navigation facility, or an airport.

Clause 3. The computing device of clause 1, wherein the text language analysis model comprises a machine learning model trained on a training data set that comprises a plurality of aviation information notices.

Clause 4. The computing device of clause 1, wherein the text language analysis model comprises an explicitly programmed algorithm.

Clause 5. The computing device of clause 1, wherein the instructions are further executable to: classify the component of the airspace system described in the raw aviation information notice; based at least on a determination that the component is a first component type, use a first language analysis model to extract first metadata from the raw aviation information notice; and based at least on a determination that the component is a second component type, use a second language analysis model to extract second metadata from the raw aviation information notice.

Clause 6. The computing device of clause 5, wherein the enriched aviation information notice comprises the first metadata and the second metadata.

Clause 7. The computing device of clause 1, wherein the geospatial aviation data comprises a map, and wherein the instructions executable to map the aviation operation information to the geospatial aviation data comprise instructions executable to: generate a geographical representation of the aviation operation information over the map; extract boundary information from the metadata, wherein the boundary information defines a region of the map affected by the aviation operation information; and use the boundary information to refine the geographical representation to the region of the map affected by the aviation operation information.

Clause 8. The computing device of clause 1, wherein the enriched aviation information notice comprises a graphical representation of the aviation operation information.

Clause 9. The computing device of clause 1, wherein the enriched aviation information notice comprises the raw aviation information notice, the geometry data, and the metadata.

Clause 10. The computing device of clause 1, wherein the instructions are executable to output the enriched aviation information notice to a database.

Clause 11. At a computing device, a method for generating an enriched aviation information notice, the method comprising: receiving a raw aviation information notice comprising text; using a text language analysis model to extract metadata from the raw aviation information notice, the metadata comprising aviation operation information describing a status of a component of an airspace system; receiving geospatial aviation data corresponding to the component of the airspace system; generating geometry data for the aviation operation information by mapping the aviation operation information to the geospatial aviation data; generating an enriched aviation information notice using the geometry data and the metadata; and outputting the enriched aviation information notice Clause 12. The method of clause 11, wherein using the text language analysis model to extract the metadata from the raw aviation information notice comprises using a machine learning model trained on a training data set comprising a plurality of aviation information notices.

Clause 13. The method of clause 11, wherein using the text language analysis model to extract the metadata from the raw aviation information notice comprises using an explicitly programmed algorithm.

Clause 14. The method of clause 11, wherein receiving the geospatial aviation data comprises receiving a map, and wherein mapping the aviation operation information to the geospatial aviation data comprises: generating a geographical representation of the aviation operation information over the map; extracting boundary information from the metadata, the boundary information defining a region of the map affected by the aviation operation information; and using the boundary information to refine the geographical representation to the region of the map affected by the aviation operation information.

Clause 15. The method of clause 11, wherein generating the enriched aviation information notice comprises generating a graphical representation of the aviation operation information.

Clause 16. The method of clause 11, wherein outputting the enriched aviation information notice comprises outputting the raw aviation information notice, the geometry data, and the metadata.

Clause 17. A computing device, comprising: a processor; and a memory comprising instructions executable by the processor to: receive a raw aviation information notice that comprises text, wherein the text includes aviation operation information that describes a status of a component of an airspace system; use a text language analysis model to extract metadata from the raw aviation information notice, wherein the metadata comprises a subset of the text, and wherein the subset of the text includes the aviation operation information; receive geospatial aviation data that corresponds to the component of the airspace system; map the aviation operation information to the geospatial aviation data to thereby generate geometry data for the aviation operation information; generate an enriched aviation information notice, wherein the enriched aviation information notice comprises the geometry data, the metadata, and the raw aviation information notice; and output the enriched aviation information notice.

Clause 18. The computing device of clause 17, wherein the text language analysis model comprises a machine learning model trained on a training data set that comprises a plurality of aviation information notices.

Clause 19. The computing device of clause 17, wherein the text language analysis model comprises an explicitly programmed algorithm.

Clause 20. The computing device of clause 17, wherein the geospatial aviation data comprises a map, and wherein the instructions executable to map the aviation operation information to the geospatial aviation data comprise instructions executable to: generate a geographical representation of the aviation operation information over the map; extract boundary information from the metadata, wherein the boundary information defines a region of the map affected by the aviation operation information; and use the boundary information to refine the geographical representation to the region of the map affected by the aviation operation information.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a processor; and
a memory storing instructions executable by the processor to:
receive a raw aviation information notice that comprises text, wherein the text describes a status of a component of an airspace system;
use a text language analysis model to extract metadata from the raw aviation information notice, the metadata comprising a summary of the status of the component of the airspace system;
receive a map that corresponds to a geographic area described in the raw aviation information notice;
generate a graphical representation of the status of the component of the airspace system;
map the graphical representation to a region of the map affected by the raw aviation information notice;
generate an enriched aviation information notice, wherein the enriched aviation information notice comprises the map, the graphical representation, the summary of the status of the component of the airspace system extracted from the raw aviation information notice, and the raw aviation information notice; and
output the enriched aviation information notice.

2. The computing device of claim 1, wherein the text describes the status of a facility, service, procedure, or hazard, and wherein the airspace system comprises an airspace region, a navigation facility, or an airport.

3. The computing device of claim 1, wherein the text language analysis model comprises a machine learning model trained on a training data set that comprises a plurality of aviation information notices.

4. The computing device of claim 1, wherein the text language analysis model comprises an explicitly programmed algorithm.

5. The computing device of claim 1, wherein the instructions are further executable to:
classify the component of the airspace system described in the raw aviation information notice;
based at least on a determination that the component is a first component type, use a first language analysis model to extract first metadata from the raw aviation information notice; and
based at least on a determination that the component is a second component type, use a second language analysis model to extract second metadata from the raw aviation information notice.

6. The computing device of claim 5, wherein the enriched aviation information notice comprises the first metadata and the second metadata.

7. The computing device of claim 1, wherein the instructions executable to map the graphical representation to the region of the map affected by the raw aviation information notice comprise instructions executable to:
generate a geographical representation of the status of the component over the map;
extract boundary information from the metadata, wherein the boundary information defines a region of the map affected by the aviation operation information; and
use the boundary information to refine the geographical representation to the region of the map affected by the raw aviation information notice.

8. The computing device of claim 1, wherein the instructions are executable to output the enriched aviation information notice to a database.

9. The computing device of claim 1, wherein the text language analysis model comprises a neural network or a generative model.

10. The computing device of claim 1, wherein the text language analysis model is configured to extract and label words and/or symbols in the text to thereby generate the metadata.

11. At a computing device, a method for generating an enriched aviation information notice, the method comprising:
receiving a raw aviation information notice comprising text, wherein the text describes a status of a component of an airspace system;
using a text language analysis model to extract metadata from the raw aviation information notice, the metadata comprising a summary of the status of the component of the airspace system;
receiving a map that corresponds to a geographic area described in the raw aviation information notice;
generate a graphical representation of the status of the component of the airspace system;
mapping the graphical representation to a region of the map affected by the raw aviation information notice;
generating an enriched aviation information notice, wherein the enriched aviation information notice comprises the map, the graphical representation, the summary of the status of the component of the airspace system extracted from the raw aviation information notice, and the raw aviation information notice; and
outputting the enriched aviation information notice.

12. The method of claim 11, wherein using the text language analysis model to extract the metadata from the raw aviation information notice comprises using a machine learning model trained on a training data set comprising a plurality of aviation information notices.

13. The method of claim 11, wherein using the text language analysis model to extract the metadata from the raw aviation information notice comprises using an explicitly programmed algorithm.

14. The method of claim 11, wherein mapping the graphical representation to the region of the map affected by the raw aviation information notice comprises:
generating a geographical representation of the aviation operation information over the map;

extracting boundary information from the metadata, the boundary information defining a region of the map affected by the aviation operation information; and using the boundary information to refine the geographical representation to the region of the map affected by the raw aviation information notice.

15. A computing device, comprising:

a processor; and a memory comprising instructions executable by the processor to:
- receive a raw aviation information notice that comprises text, wherein the text describes a status of a component of an airspace system;
- use a text language analysis model to extract metadata from the raw aviation information notice, wherein the metadata comprises a subset of the text, and wherein the subset of the text comprises a summary of the status of the component of the airspace system;
- receive a map that corresponds to a geographic area described in the raw aviation information notice;
- generate a graphical representation of the status of the component of the airspace system;
- map the graphical representation to a region of the map affected by the raw aviation information notice;
- generate an enriched aviation information notice, wherein the enriched aviation information notice comprises the map, the graphical representation, the summary of the status of the component of the airspace system extracted from the raw aviation information notice, and the raw aviation information notice; and
- output the enriched aviation information notice.

16. The computing device of claim 15, wherein the text language analysis model comprises a machine learning model trained on a training data set that comprises a plurality of aviation information notices.

17. The computing device of claim 15, wherein the text language analysis model comprises an explicitly programmed algorithm.

18. The computing device of claim 15, wherein the instructions executable to map the graphical representation to the region of the map affected by the raw aviation information notice comprise instructions executable to:
- generate a geographical representation of the status of the component of the airspace system over the map;
- extract boundary information from the metadata, wherein the boundary information defines a region of the map affected by the aviation operation information; and
- use the boundary information to refine the geographical representation to the region of the map affected by the raw aviation information notice.

19. The computing device of claim 15, wherein the text language analysis model comprises a neural network or a generative model.

20. The computing device of claim 15, wherein the text language analysis model is configured to extract and label words and/or symbols in the text to thereby generate the metadata.

* * * * *